United States Patent
Boehme et al.

(10) Patent No.: US 8,489,274 B2
(45) Date of Patent: Jul. 16, 2013

(54) DEVICE AND METHOD FOR AUTOMATICALLY MONITORING TIRE PRESSURE IN A VEHICLE AND METHOD FOR DISPLAYING INFORMATION ABOUT VEHICLE TIRE INFLATION

(75) Inventors: Aiko Boehme, Ingelheim (DE); Heiko Bald, Modautal (DE); Dirk Balzer, Nierstein (DE); Christoph Ferber, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/277,315

(22) Filed: Oct. 20, 2011

(65) Prior Publication Data

US 2012/0109449 A1 May 3, 2012

(30) Foreign Application Priority Data

Oct. 21, 2010 (DE) .................. 10 2010 049 088

(51) Int. Cl.
*G01M 17/02* (2006.01)
*B60C 23/02* (2006.01)

(52) U.S. Cl.
USPC ........................................ 701/34.4; 340/442

(58) Field of Classification Search
USPC ................... 701/34.4; 340/442; 73/146.2
See application file for complete search history.

(56) References Cited

U.S. PATENT DOCUMENTS

| 7,216,532 B2 | 5/2007 | Rimkus et al. | |
| 7,271,709 B2* | 9/2007 | Miller et al. | 340/442 |
| 2003/0156021 A1* | 8/2003 | Tabata et al. | 340/442 |
| 2008/0042817 A1 | 2/2008 | Fogelstrom | |
| 2010/0073158 A1* | 3/2010 | Uesaka et al. | 340/450.2 |

FOREIGN PATENT DOCUMENTS

| CN | 101332749 A | | 12/2008 |
| DE | 10237699 | * | 7/2003 |
| DE | 10237699 A1 | | 7/2003 |
| DE | 102006038059 A1 | | 3/2007 |
| DE | 102007007672 A1 | | 8/2007 |
| DE | 102007035934 A1 | | 4/2008 |
| DE | 102008052282 A1 | | 4/2010 |

\* cited by examiner

*Primary Examiner* — Mary Cheung
*Assistant Examiner* — Brian P Sweeney
(74) *Attorney, Agent, or Firm* — Ingrassia Fisher & Lorenz, P.C.

(57) ABSTRACT

A device and method are provided for automatically monitoring tire pressure in a vehicle, as well as a method for displaying information about vehicle tire inflation. The method for automatically monitoring tire pressure in a vehicle encompasses indirectly determining the actual temperature in a vehicle tire. The actual temperature is ascertained based on empirically determined families of characteristics as a function of parameters that describe environmental conditions, driving conditions and/or material properties of the vehicle tires.

15 Claims, 2 Drawing Sheets

DEVICE AND METHOD FOR AUTOMATICALLY MONITORING TIRE PRESSURE IN A VEHICLE AND METHOD FOR DISPLAYING INFORMATION ABOUT VEHICLE TIRE INFLATION

CROSS-REFERENCE TO RELATED APPLICATION

This application claims priority to German Patent Application No. 102010049088.1, filed Oct. 21, 2010, which is incorporated herein by reference in its entirety.

TECHNICAL FIELD

The technical field relates to a device and a method for automatically monitoring tire pressure in a vehicle. The technical field further relates to a method for displaying information about vehicle tire inflation, for example on a screen or segment display.

BACKGROUND

The job of tire pressure monitoring systems is to monitor vehicle tire inflation and issue warnings if the pressure in the vehicle tires drops below a prescribed value. This is intended to ensure the operational reliability of vehicles on the one hand, and their economic and fuel-efficient operation on the other.

Vehicle tires heat up during operation, causing the pressure inside them to rise. Therefore, the required tire pressure is higher when the tires are hot as compared to when the tires are cold. This poses the problem to the driver when measuring the pressure of a hot tire of whether the measured pressure corresponds to the one required without knowing the exact current tire temperature and how the pressure depends on it in the heated state, which is also called hot air pressure. In general, the driver only knows the required pressure in the cold state, which is also called cold air pressure, for example which is printed on a sticker inside the vehicle and/or can be gleaned from the operating manual.

Known from DE 102 37 699 A1 is to measure the actual temperature in the vehicle tires by means of the temperature sensors arranged in the vehicle tires and use the latter to convert preset desired pressures at a reference temperature (e.g., cold tires) into desired pressures at the actual temperature. The desired pressure at the actual temperature is imparted to the driver. However, proceeding in this way presumes that each vehicle tire has temperature sensors.

Therefore, at least object is to indicate a method and a device for automatically monitoring tire pressure in a vehicle, which makes it possible to reliably monitor the tire pressure with little technical outlay. At least another object of the invention beyond that is to indicate a method for displaying information about the inflation of a vehicle tire, which makes it possible to inform the driver in an especially easy to understand way when a vehicle tire needs to be inflated. In addition, other objects, desirable features and characteristics will become apparent from the subsequent summary and detailed description, and the appended claims, taken in conjunction with the accompanying drawings and this background.

SUMMARY

A method is provided for automatically monitoring tire pressure in a vehicle. The method involves indirectly determining the actual temperature in a vehicle tire. The actual temperature is here ascertained based on empirically determined families of characteristics as a function of parameters that describe environmental conditions, driving conditions and/or material properties of the vehicle tires. Therefore, this method does not require that the temperature in the vehicle tires be measured directly. Rather, it is determined from the empirically found characteristics stored in a memory. The advantage to the above is that the vehicle tires can do without temperature sensors. These sensors would have to be dedicated solely to determining the hot air pressure, giving them a rather narrow utility when installation and maintenance outlay are considered.

Many vehicles instead use sensors that are already present anyway, like those for the outside temperature, speed and acceleration, to estimate the heating of vehicle tires based on empirically found characteristics. This reduces the technical outlay for determining the hot air pressure, since software is used to store the characteristics and determine the temperature in the vehicle tires, and no special hardware is needed.

A range of parameters can be used as parameters that describe the environmental conditions, driving conditions and/or material properties of the vehicle tires. In their selection, emphasis can be placed on utilizing sensor technology already present in the vehicle. In addition, those parameters can be selected that typically have the greatest influence on the temperature in the vehicle tires.

In one embodiment, the outside temperature is used as a parameter. Alternatively or additionally, other types of weather data can be used, for example, road wetness as determined by rain sensors or exposure of the vehicle tires to solar radiation as determined by sun sensors. The tire size and/or tire type of the vehicle tire can also be used as a parameter. Examples of parameters that can be used to describe driving conditions include the speed profile, acceleration profile and/or steering profile of the vehicle. In addition, the weight load of the vehicle can be used as a parameter. For example, the current vehicle load capacity or current overall weight of the vehicle can here be considered. Further, the time elapsed since the vehicle was last driven can be used as a parameter. If the used parameters, for example speed or weather data, vary over time, they should advantageously be considered over the period for which they significantly influence the temperature in the vehicle tires. Ideally, the entire period since the drive began or engine was started is taken into account. If the engine was last started shortly after the vehicle was used, meaning if the time elapsed between when the engine was last started up and the vehicle was last driven is relatively short, then a period before as well. During longer drives, the considered period can also be distinctly shorter than the time elapsed since the drive began.

In one embodiment, the actual temperature in the vehicle tire is used to determine a desired value for the pressure in the vehicle tire at the actual temperature. This desired value for the pressure in the vehicle tire at the actual temperature can be shown to the driver on a display device. The advantage to this is that the driver can glean the desired value directly from the display at the current temperature.

In one embodiment, a method is provided for displaying information about the inflation of a vehicle tire involves indicating a difference between a desired value for the pressure in the vehicle tire in the case of cold vehicle tires and the desired value for the pressure at the actual temperature, as well as the actual value for the pressure at the actual temperature. In this approach, the driver adds the displayed difference to the prescribed desired value for the pressure in the case of cold tires, and receives the desired value at the actual temperature, which he or she can compare with the also displayed actual value for the pressure at the actual temperature.

In another embodiment, a method is provided for displaying information about the inflation of a vehicle tire involves having a segment display indicate at least the desired value for the pressure at the actual temperature, or a difference between a desired value for the pressure in the vehicle tire in the case a cold vehicle tire and the desired value for the pressure at the actual temperature. The advantage to this method is that it only requires that a single numerical value be displayed. This has the advantage that the display need not provide an explanation as to which values are being indicated. Rather, the display is unambiguous. This is advantageous in particular when the vehicle has no screen, but only a segment display for indicating the pressure. For example, this may be the case in relatively simply equipped entry-level models or retrofitted tire pressure monitoring systems. In this method, it can be noted in a suitable place, for example in the operating manual and/or on a corresponding sticker in the vehicle, where the driver can find the segment display with the desired value for the pressure at the actual temperature or the difference between the desired value for the pressure in the vehicle tire in the case of cold vehicle tires and the desired value for the pressure at the actual temperature.

If the segment display shows the desired value for pressure at the actual temperature, the driver can take it into account directly when checking the pressure at a gas station, for example. If the segment display shows the difference between the desired value for the pressure in the vehicle tire in the case of cold vehicle tires and the desired value for the pressure at the actual temperature, the driver need only add this difference to the cold air pressure noted in the operating manual or some other place to obtain the currently required pressure.

In one embodiment, information about vehicle tire inflation is always displayed when a pressure warning is issued. Alternatively or additionally, it can take place when requested by a user. The advantage to both is that the information is only displayed when currently needed. Given the great variety of information displayed in vehicles today, this offers the advantage of clarity.

Provided in embodiment is a device for automatically monitoring tire pressure in a vehicle. The device exhibits sensors for determining tire pressure, as well as a central controller or engine control unit. The central controller here accesses a memory, in which empirically determined families of characteristics are stored for ascertaining an actual temperature in the vehicle tire as a function of parameters that describe the environmental conditions, driving conditions and/or material properties of the vehicle tires. The tire pressure can here be determined either directly by means of pressure sensors or indirectly with known methods.

Provided in an embodiment is a computer program product for implementing the described method when the computer program is executed on a computer or controller in the vehicle.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
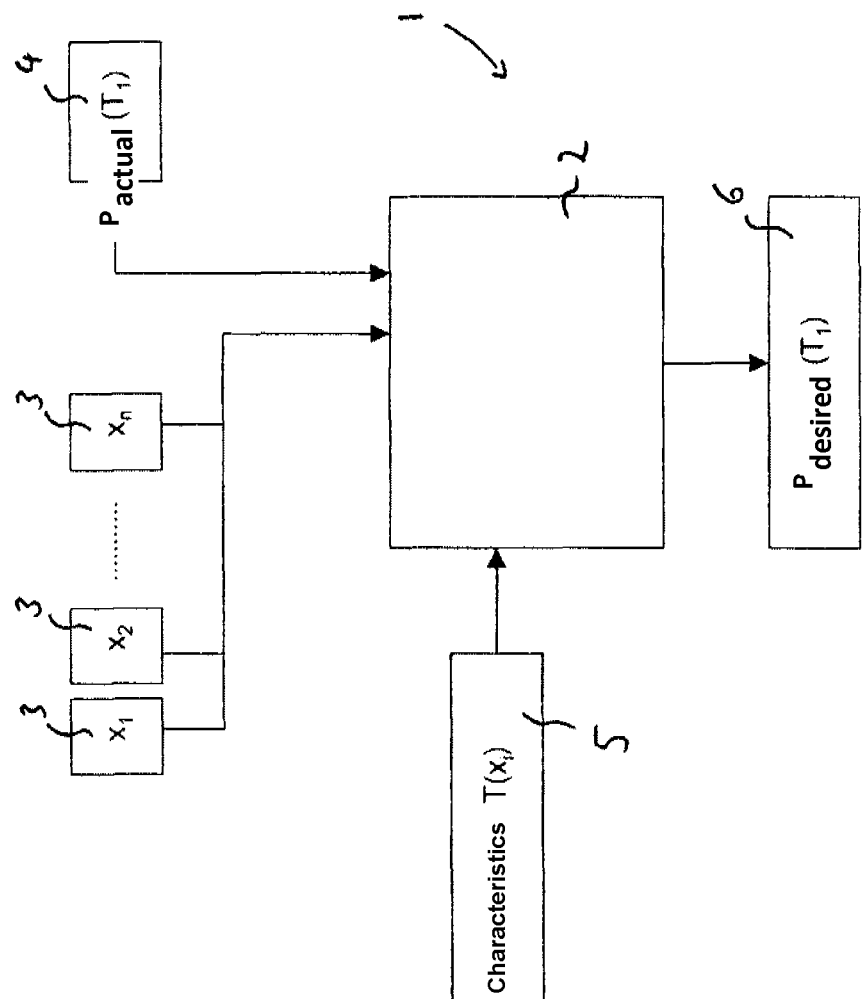
FIG. 1 shows a block diagram of a device for automatically monitoring the tire pressure in a vehicle according to a first embodiment.

The block diagram according to FIG. 1 provides a diagrammatic view of a device 1 for automatically monitoring the tire pressure in a vehicle according to a first embodiment. The device 1 encompasses an engine control unit 2 with a computer unit, which runs an automatic tire pressure monitoring program.

For this purpose, the engine control unit receives a series of input variables, with the pressure sensors 4 in particular providing the current actual values $p_{actual}(T_1)$ for the tire pressures in all tires of the vehicle at the present temperature $T_1$, as well as a series of parameters $x_1$ to $x_n$, which describe the environmental conditions, driving conditions and/or material properties of the vehicle tires. Used in particular as parameters $x_1$ to $x_n$ are the current outside temperature, additional weather data like humidity and solar radiation, tire size and/or tire type of the vehicle tires, values for speed, acceleration and steering angle, a weight load of the vehicle, as well as the time elapsed since the last time the vehicle was driven. For example, the parameters for speed, acceleration and steering angle can be used by the engine control unit 2 to determine a speed profile, an acceleration profile and/or a steering profile for the vehicle over a specific period of time.

A memory 5 accessed by the engine control unit 2 stores empirically determined families of characteristics $T(x_i)$, which describe the temperature in the vehicle tires as a function of parameters $x_1$ to $x_n$. The engine control unit 2 determines the actual temperature $T_1$ in the vehicle tires from parameters $x_1$ to $x_n$ based on the families of characteristics $(T(x_i)$, and further uses the latter to derive the desired value for the pressure in the vehicle tires at the actual temperature $T_1$ from it and from a prescribed desired value for the pressure in the case of cold vehicle tires $(p_{desired}(T_0))$. This desired value $p_{desired}(T_1)$ is provided as the output variable. A display 6 shows $p_{desired}(T_1)$ to the driver upon request or given a pressure warning.

For example, the desired value for pressure in a vehicle with cold tires can measure 2.1 bars, while the desired value for tires heated to a temperature $T_1$ can measure 2.6 bars. In the embodiment described, the display would thus show the driver a value of 2.6 bars, which he or she could use for purposes of comparison, for example, with a tire pressure currently measured at a gas station.

In an alternative embodiment not depicted, the display 6 in this method can also show the driver the actual value for pressure measured by the sensor 4 at the current temperature $P_{actual}(T_1)$, as well as the difference $p_{desired}(T_1)-p_{desired}(T_0)$. Following this numerical example, the driver would thus be shown 2.2 bars as the actual value for the pressure at the current temperature, for example, along with 0.5 bars as the difference $p_{desired}(T_1)-p_{desired}(T_0)$. In this case, the driver would have to know the prescribed desired value of 2.1 bars for cold tires or derive it from the operating manual, and by adding the indicated difference of 0.5 bars would obtain a desired value for the pressure at the current temperature of 2.6 bars, which exceeds the actual value of 2.2 bars.

In another alternative embodiment not depicted, the display 6 designed as a segment display in this method can also show the driver the desired value for the pressure at the actual temperature $p_{desired}(T_1)$ or the difference $p_{desired}(T_1)-p_{desired}(T_0)$. With respect to the numerical example given, the driver would thus be shown a single value, specifically either a desired value of 2.6 bar or the difference of 0.5 bar, which he or she would add to the prescribed desired value of 2.1 bar for cold tires.

Figure 2:
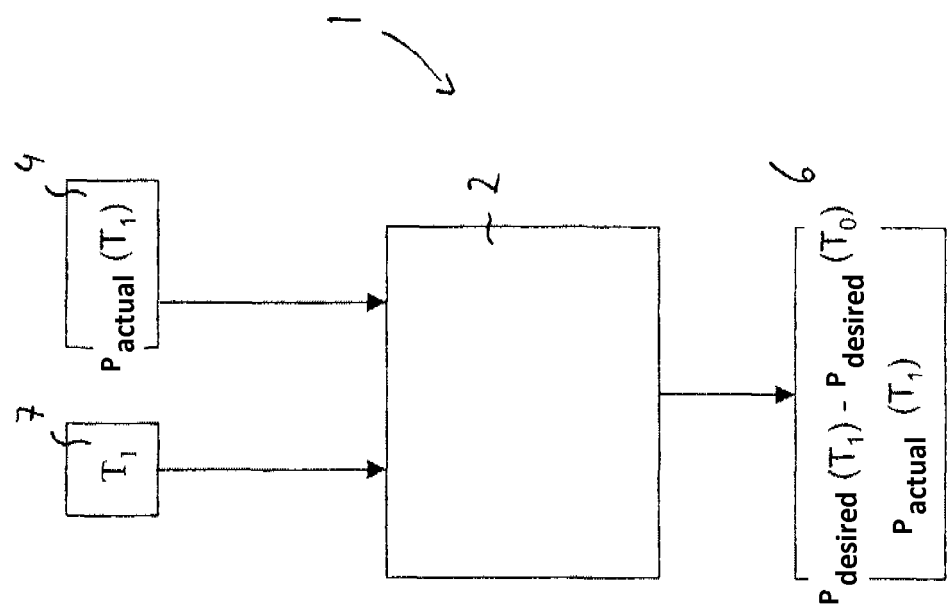
FIG. 2 shows a block diagram of a device for automatically monitoring the tire pressure in a vehicle according to a second embodiment.

FIG. 2 provides a diagrammatic view of a device 1 for automatically monitoring the tire pressure in a vehicle according to a second embodiment. In this embodiment, the actual temperature in the tires is measured directly by means of a temperature sensor 7. In this case, the display 6 would show the actual value measured by the sensor 4 for the pressure at the current temperature $p_{actual}(T_1)$, as well as the difference $p_{desired}(T_1)-p_{desired}(T_0)$. In an embodiment not depicted, the display 6 designed as a segment display shows the driver the desired value for the pressure at the actual temperature $p_{desired}(T_1)$, or the difference $p_{desired}(T_1)-p_{desired}(T_0)$.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for monitoring tire pressure in a tire of a vehicle, the method comprising:
    storing, in a memory, empirically determined families of characteristics that describe temperature in the tire as a function of a series of parameters, wherein the series of parameters comprise: environmental conditions outside the vehicle; driving conditions; and material properties of the tire;
    receiving, at an engine control unit, input variables comprising: a current actual value of tire pressure in the tire, and values for each of the series of the parameters;
    accessing, at the engine control unit, the empirically determined families of characteristics from the memory; and
    indirectly determining, at the engine control unit, an actual temperature in the tire from the values for each of the series of parameters based on the empirically determined families of characteristics that are accessed from memory.

2. The method according to claim 1, wherein the step of indirectly determining comprises:
    indirectly determining, at the engine control unit without using an input from a temperature sensor disposed in the tire, the actual temperature in the tire from the values for each of the series of parameters based on the empirically determined families of characteristics accessed from the memory.

3. The method according to claim 1, wherein the environmental conditions outside the vehicle comprise:
    an outside temperature, and wherein a value of the outside temperature is obtained from a temperature sensor that is external to the tire.

4. The method according to claim 1, wherein the material parameters comprise at least one of:
    tire size; and
    tire type.

5. The method according to claim 3, wherein the environmental conditions further comprise:
    weather data obtained from at least one of a rain sensor or a sun sensor.

6. The method according to claim 1, wherein the driving conditions comprise at least one of:
    a speed profile for the vehicle;
    an acceleration profile for the vehicle; and
    a steering profile for the vehicle.

7. The method according to claim 1, wherein the series of parameters further comprise:
    a weight load of the vehicle.

8. The method according to claim 1, wherein the driving conditions further comprise:
    a time elapsed since the vehicle was last driven.

9. A device for automatically monitoring a tire pressure in a vehicle, comprising:
    a memory configured to store empirically determined families of characteristics that describe temperature in the tire as a function of a series of parameters, wherein the series of parameters comprise: environmental conditions outside the vehicle; driving conditions; and material properties of the tire;
    a sensor configured to determine the tire pressure;
    an engine control unit configured to:
        access the empirically determined families of characteristics from the memory;
        receive input variables comprising: a current actual value of the tire pressure from the sensor, and values for each of the series of the parameters; and
        determine an actual temperature in the tire from the values for each of the series of parameters based on the empirically determined families of characteristics that are accessed from the memory.

10. The device according to claim 9, wherein the engine control unit is configured to indirectly determine, without using an input from a temperature sensor disposed in the tire, the actual temperature in the tire from the values for each of the series of parameters based on the empirically determined families of characteristics accessed from the memory.

11. The device according to claim 9, wherein the environmental conditions outside the vehicle comprise:
    an outside temperature.

12. The device according to claim 9, wherein the material parameters comprise:
    tire size; and
    tire type.

13. A non-transitory computer readable medium embodying a computer program product for programming an engine control unit of a vehicle to perform a method, the method comprising:
    monitoring tire pressure, wherein monitoring tire pressure comprises:
        receiving, at the engine control unit, input variables comprising: a current actual value of tire pressure in a tire of the vehicle, and values for each of a series of parameters comprising environmental conditions outside the vehicle, driving conditions, and material properties of the tire;
        accessing, at the engine control unit, empirically determined families of characteristics stored in a memory, wherein empirically determined families of characteristics describe temperature in the tire as a function of the series of parameters; and indirectly determining, at the engine control unit based on the values for each of the series of parameters and the empirically determined families of characteristics accessed from the memory an actual temperature in the tire.

14. The method according to claim 13, wherein the driving conditions comprise at least one of:

a speed profile for the vehicle obtained from a speed sensor that senses the speed of the tire;

an acceleration profile for the vehicle; and a steering profile for the vehicle.

15. The method according to claim 13, wherein the series of parameters further comprise:

a weight load of the vehicle.

* * * * *